March 31, 1942. D. W. AULD ET AL 2,277,837
AUTOMATIC SWITCHING VALVE
Filed Oct. 14, 1939 2 Sheets-Sheet 1

INVENTOR
D. W. AULD
C. T. WOODARD
BY
Hudson, Young, Shanley & Yeager
ATTORNEYS

Patented Mar. 31, 1942

2,277,837

UNITED STATES PATENT OFFICE 2,277,837

AUTOMATIC SWITCHING VALVE

Donald W. Auld, Bartlesville, and Clarence T. Woodard, Nowata, Okla., assignors to Phillips Petroleum Company, a corporation of Delaware Application October 14, 1939, Serial No. 299,538

4 Claims. (Cl. 137—68)

This invention relates to an automatic valve for controlling the flow of liquids into storage tanks: more particularly, it relates to a valve which will remain open during the time the tank is filling, but will close when the tank becomes filled and divert flow to the next tank.

In many industrial operations, raw materials or products must be stored as liquids in suitable storage tanks until they are to be used or transported to market. This is especially true in the petroleum industry. Usual practice has been to provide a battery of storage tanks with a system of piping and manually operated valves for controlling the flow of liquid to and from the tanks. Operation of a system of this type requires an attendant to be present to close the inlet valve to a tank as it becomes filled and direct the flow to another tank.

With the present invention it is not necessary for an attendant to be present when a tank approaches being full. A float control automatically stops flow to the tank when the liquid reaches a predetermined level and diverts the liquid to another tank. At the discretion of the operator, any tank may be by-passed while it is being emptied or cleaned. The attendant may proceed with other duties and make only occasional visits to the storage tanks.

Various attempts have been made heretofore to provide automatic valves to accomplish this result. Such valves have had numerous disadvantages; mainly, they were subject to corrosion of working parts exposed to weather and were sometimes rendered inoperable due to freezing of ice or snow on exposed parts.

It is an object of this invention to provide a battery of storage tanks with an automatic means which will allow the tanks to fill and close off when full without an attendant being present.

A further object of this invention is to provide a device which may be set by the operator to direct flow into or past a storage tank.

A still further object of this invention is to provide a device which on being set by the operator to direct flow into a tank will, upon the level in the tank reaching a predetermined height, divert the flow to another tank.

Another object of this invention is to provide a device of the character described having its working parts protected from the weather.

Other objects and advantages will be apparent from the following detailed description and accompanying drawings forming a part of this specification.

Figure 1:
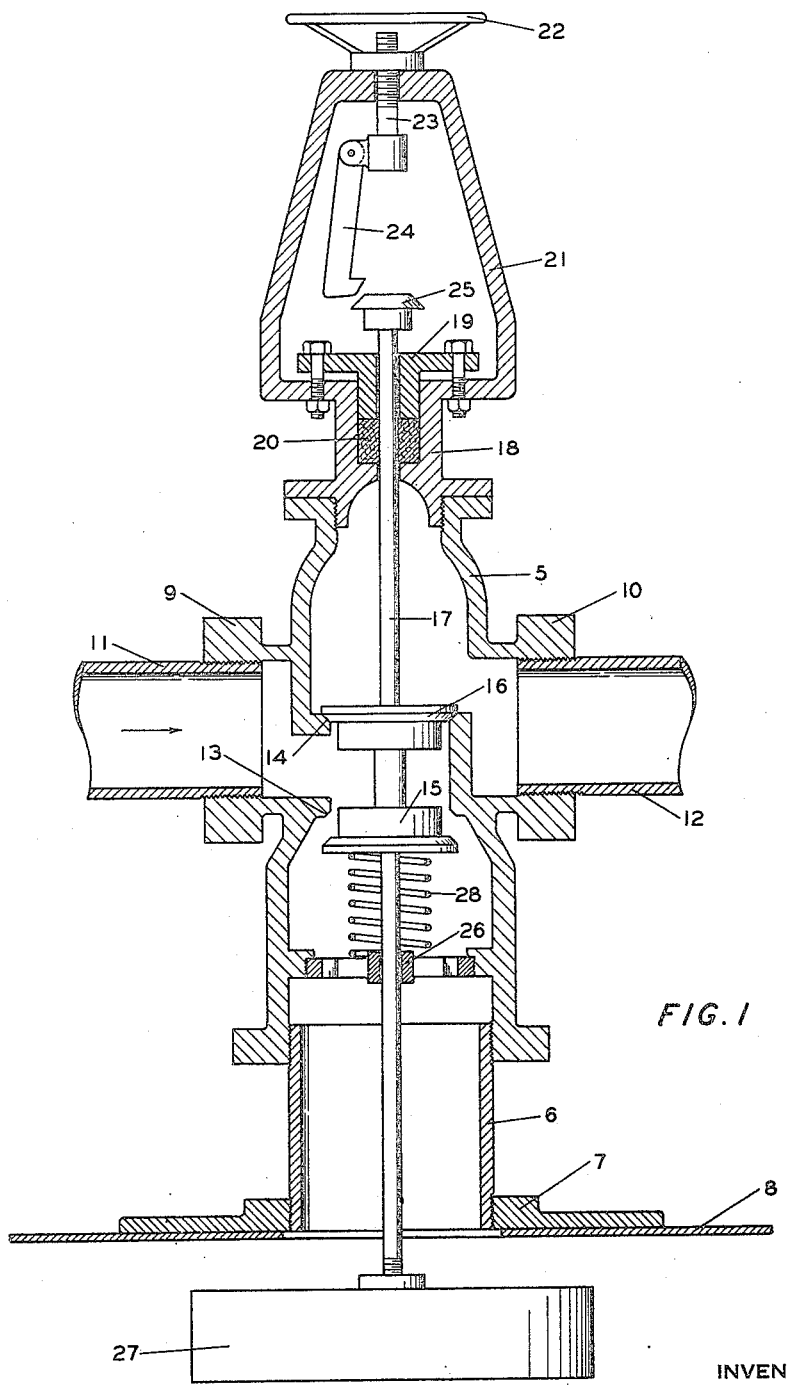
Figure 1 is a vertical sectional view illustrating one form of the present invention.

Referring to Figure 1, a valve body member 5 is connected by nipple 6 and flange 7 to the top 8 of a storage tank. Body member 5 is provided with threaded portions 9 and 10 to receive flow line 11 from the source of supply and line 12 which may be connected to a similar valve on an adjacent storage tank. Valve seats 13 and 14 are provided within body member 5 and are adapted to cooperate with valve disks 15 and 16 secured to stem 17. Stem 17 extends upwardly through bonnet 18 and packing gland 19, and is surrounded by packing 20. Bail 21 comprises a part of bonnet 18 and supports a hand wheel 22 which is in threaded engagement with an adjusting rod 23. Adjusting rod 23 extends through bail 21 in vertical alignment with valve stem 17 and has a latch 24 pivotally mounted at its lower end, designed to cooperate with button 25 which is secured to the upper end of stem 17. Valve stem 17 extends downwardly through guide 26 below tank top 8 where it connects with control float 27. Spring 28 is interposed between guide 26 and valve disk 15 to assist float 27 in seating disk 15.

Figure 2:
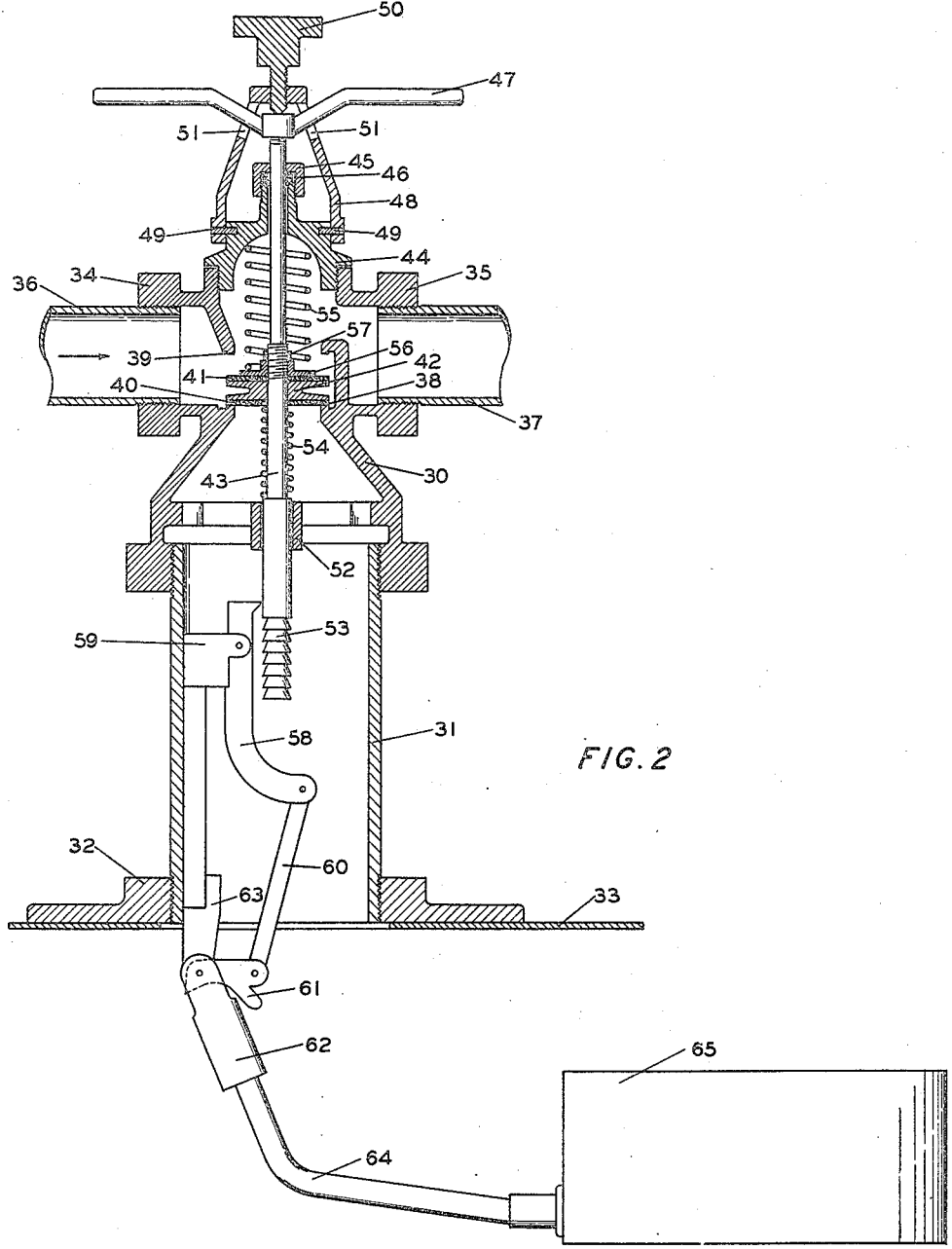
Figure 2 is a vertical sectional view illustrating a preferred embodiment of this invention.

Referring to Figure 2, a valve body 30 is connected by nipple 31 and flange 32 to the top 33 of a storage tank. Threaded portions 34 and 35 receive flow line 36 from the source of supply and line 37 which may be connected to a similar valve on an adjacent storage tank. Valve seats 38 and 39 are provided within body 30 and are adapted to cooperate with gaskets 40 and 41 on valve disk 42. Valve disk 42 is slidably mounted on stem 43 which extends upwardly through bonnet 44 and packing nut 45 containing a suitable packing medium 46. A handle 47 is secured to the upper end of stem 43 to allow manual setting of the valve mechanism. Bail 48 is pivotally mounted on bonnet 44 by pins 49. A positive shut-off screw 50 is threadedly connected to bail 48 and is designed to coact with handle 47 and stem 43 to provide a means of positively seating gasket 40 on seat 38. Bail 48 may be swung into inoperative position about pins 49. When in operative position, as illustrated in the figure, slots 51 allow handle 47 to be moved relative to bail 48 for effecting positive shut-off. Stem 43 extends downwardly through guide 52 and has a series of circumferential notches 53 at its lower end. Spring 54 is interposed between guide 52 and disk 42 to urge disk 42 in an upward direction. Spring 55 in the compartment between bonnet 44 and valve seat 39 exerts a downward thrust on valve stem 43 through backing plate 56 which is in threaded engagement with stem 43 and is held in position by lock nut 57. Spring 55 exerts a downward force on plate 56 of sufficient magnitude to overcome the opposing force of spring 54 and seat gasket 40 on seat 38. Latch 58, designed to engage notches 53 in valve stem 43, is pivotally mounted on upper fulcrum 59. Connecting link 60 is pivotally connected to one end of latch 58 and to float trigger 61. Trigger 61 and float yoke 62 are pivotally mounted on lower fulcrum 63. Float arm 64 provides connection between float 65 and yoke 62.

The valve embodiment illustrated in Figure 1 is shown in tank filling position with disk 16 seated on seat 14 and disk 15 unseated to allow free flow of liquid from supply line 11 through nipple 6 into the tank. The valve is held in this position against the force of spring 28 by the weight of float 27. Flow from the supply line into the tank will continue until the liquid in the tank reaches a predetermined level whereupon float 27, assisted by spring 28, will raise stem 17 and cause disk 15 to move upwardly against valve seat 13, shutting off the flow of oil to the storage tank. This action of stem 17 simultaneously unseats disk 16 from seat 14 and allows liquid from pipe 11 to flow into the compartment above disk 16 and out through line 12 to the next storage tank. Button 25 moves upwardly with stem 17 and latch 24 drops into shut-off position on the underside of the button. Latch 24 and button 25 hold the valve in shut-off position until the tank has been pumped out and the operator again desires to fill the tank. Latch 24 is then released, whereupon valve stem 17 returns to its original position, allowing liquid to flow into the storage tank. The valve embodiment illustrated in Figure 2 is shown in by-pass position with gasket 40 seated on valve seat 38. Liquid flowing through supply line 36 flows through the opening defined by valve seat 39 into the compartment containing spring 55 and out through line 37. When liquid in the storage tank has been pumped out, float 65 will swing downwardly about lower fulcrum 63, releasing trigger 61. When the operator desires to refill the tank, positive shut-off screw 50 is released, and bail 48 swung into inoperative position. Valve stem 43 is pulled upwardly by handle 47, compressing spring 55. At the same time, latch 58 engages a corresponding notch 53 on stem 43, holding the stem in set position. The action of spring 54 on disk 42 forces it upwardly, unseating gasket 40 from seat 38 and seating gasket 41 on seat 39. Liquid from supply line 36 then flows past valve seat 38, through nipple 31 into the tank. When the liquid in the tank rises to a predetermined level, float 65 will rise, causing yoke 62 to engage trigger 61. Motion imparted to trigger 61 by yoke 62 is transmitted to latch 58 by connecting link 60, disengaging latch 58 from notches 53, and thereby releasing stem 43. Spring 55 forces disk 42 and stem 43 downward, causing gasket 40 to seat on valve seat 38, cutting off flow to the storage tank and by-passing the liquid through the valve body to line 37. The operator may then lock the valve in by-pass position by swinging bail 48 into operating position and tightening positive shut-off screw 50. The valve is then in its original position.

While we have illustrated and described two modifications of the present invention, it is to be understood that various changes may be made in the size, shape, and relative position of parts without departing from the spirit of our invention, as set forth in the appended claims.

We claim:

1. An automatic by-pass valve comprising a body having an inlet and a pair of outlets, one outlet connecting to a storage tank and the other outlet connecting to a flow line, a valve rod within the body, a valve slidably mounted on the rod intermediate the outlets for alternately opening and closing said outlets, spring means for normally urging the valve in a direction to open the outlet to the flow line and close the outlet to the storage tank, spring means relatively weaker than the first spring means for urging the valve in a direction to open the outlet to the storage tank and close the outlet to the flow line, means for setting the valve to close the outlet to the flow line against the action of the first spring means, and float means controlled by the liquid level in the storage tank to release the last mentioned means and permit the opening of the outlet to the flow line and closing of the outlet to the storage tank.

2. An automatic by-pass valve comprising a body having an inlet and a pair of outlets, one outlet connecting to a storage tank and the other outlet connecting to a flow line, a valve rod positioned substantially vertically within the body, a valve slidably mounted on the valve rod intermediate the outlets for alternately opening and closing said outlets, a member on the valve rod for limiting upward movement of the valve with respect to the rod, a spring surrounding the valve rod above the valve and bearing against the member, said spring normally urging the valve stem and the valve downwardly to open the outlet to the flow line and close the outlet to the storage tank, a second spring relatively weaker than the first spring surrounding the valve rod below the valve for urging the valve upwardly to open the outlet to the storage tank and close the outlet to the flow line, means for setting the valve stem in a predetermined upward position against the action of the first mentioned spring and allowing the second spring to move the valve upwardly to open the outlet to the storage tank and close the outlet to the flow line, and float means controlled by the liquid level in the storage tank to release the last mentioned means.

3. An automatic by-pass valve comprising a body having an inlet and a pair of outlets, one outlet connecting to a storage tank and the other outlet connecting to a flow line, valve seats within the body at the entrance to the respective outlets, a valve rod within the body, a valve slidably mounted on the rod intermediate the valve seats for alternately opening and closing said outlets, means for limiting movement of the valve with respect to the rod in one direction, means for urging the valve against the last mentioned means, means including a plurality of spaced notches on the rod and a pivotally supported latch cooperating with a notch for releasably maintaining the rod in a predetermined position to open the outlet to the storage tank and close the outlet to the flow line, and float means controlled by the liquid level in the storage tank to effect release of the latch from the notch.

4. An automatic by-pass valve comprising a body having an inlet and a pair of outlets, one outlet connecting to a storage tank and the other outlet connecting to a flow line, a valve rod positioned substantially vertically within the body, a valve slidably mounted on the valve rod intermediate the outlets for alternately opening and closing said outlets, a member on the valve rod for limiting upward movement of the valve with respect to the rod, a spring surrounding the valve rod above the valve and bearing against the member, said spring normally urging the valve rod and the valve downwardly to open the outlet to the flow line and close the outlet to the storage tank, a second spring relatively weaker than the first spring surrounding the valve rod below the valve for urging the valve upwardly to open the outlet to the storage tank and close the outlet to the flow line, means including a plurality of spaced notches on the valve rod below the second spring and a pivotally supported latch cooperating with a notch for setting the valve rod in an upward position against the action of the first mentioned spring and allowing the second spring to move the valve upwardly to open the outlet to the storage tank and close the outlet to the flow line, and float means controlled by the liquid level in the storage tank to effect release of the latch from the notch.

DONALD W. AULD.
CLARENCE T. WOODARD.